US009819925B2

(12) United States Patent
Posselius et al.

(10) Patent No.: US 9,819,925 B2
(45) Date of Patent: Nov. 14, 2017

(54) STEREO VISION FOR SENSING VEHICLES OPERATING ENVIRONMENT

(71) Applicants: CNH Industrial America LLC, New Holland, PA (US); Autonomous Solutions, Inc., Petersboro, UT (US)

(72) Inventors: John H. Posselius, Ephrata, PA (US); Christopher A. Foster, Mohnton, PA (US); Bret T. Turpin, Wellsville, UT (US); Daniel J. Morwood, Amalga, UT (US); Thomas M. Petroff, Richmond, UT (US); Brad A. Baillio, Smithfield, UT (US); Chad B. Jeppesen, Richmond, UT (US)

(73) Assignees: CNH Industrial America LLC, New Holland, PA (US); Autonomous Solutions, Inc., Petersboro, UT (US)

( * ) Notice: Subject to any disclaimer, the term of this patent is extended or adjusted under 35 U.S.C. 154(b) by 280 days.

(21) Appl. No.: 14/689,881

(22) Filed: Apr. 17, 2015

(65) Prior Publication Data
US 2017/0064278 A1 Mar. 2, 2017

Related U.S. Application Data

(60) Provisional application No. 61/981,408, filed on Apr. 18, 2014.

(51) Int. Cl.
*H04N 13/02* (2006.01)
*H04N 9/80* (2006.01)
(Continued)

(52) U.S. Cl.
CPC ........ *H04N 13/004* (2013.01); *G05D 1/0251* (2013.01); *G06K 9/00791* (2013.01);
(Continued)

(58) Field of Classification Search
None
See application file for complete search history.

(56) References Cited

U.S. PATENT DOCUMENTS 7,030,907 B2   4/2006  Nagao et al.
7,130,448 B2  10/2006  Nagaoka et al.
(Continued)

FOREIGN PATENT DOCUMENTS

EP  1 921 567 A2    5/2008
JP  2007-336288 A  12/2007
JP  2008-35365 A    2/2008

OTHER PUBLICATIONS

"Overview of Benefits, Challenges, and Requirements of Wheeled-Vehicle Mounted Infrared Sensors", John Lester Miller, Paul Clayton and Stefan F. Olsson, SPIE 8704, Infrared Technology and Applications XXXIX 87040I, Jun. 11, 2013 (3 pages).
(Continued)

*Primary Examiner* — Hung Dang
(74) *Attorney, Agent, or Firm* — Rebecca L. Henkel; Rickard K. DeMille

(57) ABSTRACT

A vehicle including a chassis, a drive system carrying the chassis, and a vision system carried by the chassis. The vision system having a stereo visible light camera producing a colorized 3D point cloud and a stereo long wave infrared camera producing 3D data. The vision system being configured to fuse the 3D data with the 3D point cloud thereby producing an enhanced 3D point cloud.

15 Claims, 14 Drawing Sheets

(51) Int. Cl.

| | | |
|---|---|---|
| *H04N 5/77* | (2006.01) | |
| *H04N 13/00* | (2006.01) | |
| *G06T 5/50* | (2006.01) | |
| *G06T 7/593* | (2017.01) | |
| *G05D 1/02* | (2006.01) | |
| *G06K 9/00* | (2006.01) | |
| *G06K 9/46* | (2006.01) | |
| *G06K 9/62* | (2006.01) | |
| *H04N 5/33* | (2006.01) | |

(52) U.S. Cl.
CPC ............ *G06K 9/46* (2013.01); *G06K 9/6202* (2013.01); *G06T 5/50* (2013.01); *G06T 7/593* (2017.01); *H04N 5/33* (2013.01); *H04N 13/0037* (2013.01); *H04N 13/025* (2013.01); *H04N 13/0242* (2013.01); *G06T 2207/10024* (2013.01); *G06T 2207/10048* (2013.01); *G06T 2207/30248* (2013.01); *H04N 2013/0077* (2013.01); *H04N 2013/0092* (2013.01)

(56) References Cited

U.S. PATENT DOCUMENTS

| | | | |
|---|---|---|---|
| 7,151,439 | B2 | 12/2006 | Moisel et al. |
| 7,199,366 | B2 | 4/2007 | Hahn et al. |
| 7,733,464 | B2 | 6/2010 | David et al. |
| 7,834,905 | B2 | 11/2010 | Hahn et al. |
| 7,925,050 | B2 | 4/2011 | Nagaoka et al. |
| 8,228,379 | B2 | 7/2012 | Kallhammer et al. |
| 8,400,511 | B2 | 3/2013 | Wood et al. |
| 8,519,837 | B2 | 8/2013 | Kirsch et al. |
| 8,577,517 | B2 | 11/2013 | Phillips et al. |
| 2005/0246065 | A1* | 11/2005 | Ricard .................. G01S 7/4817 700/258 |
| 2006/0018513 | A1 | 1/2006 | Sogawa |
| 2006/0204038 | A1 | 9/2006 | Yokota et al. |
| 2007/0222565 | A1 | 9/2007 | Kawamata et al. |
| 2008/0199069 | A1 | 8/2008 | Schick et al. |
| 2008/0203308 | A1 | 8/2008 | Yoo |
| 2009/0180668 | A1* | 7/2009 | Jones .................... G06F 3/017 382/103 |
| 2010/0098327 | A1* | 4/2010 | Se ........................ G01C 11/06 382/154 |
| 2011/0101239 | A1* | 5/2011 | Woodhouse ......... G01S 7/4802 250/458.1 |
| 2012/0038748 | A1 | 2/2012 | Lindgren |
| 2012/0056982 | A1 | 3/2012 | Katz et al. |
| 2012/0287239 | A1* | 11/2012 | Mitchell ............... H04N 13/02 348/46 |
| 2013/0250123 | A1* | 9/2013 | Zhang ..................... G06T 7/33 348/164 |
| 2015/0193963 | A1* | 7/2015 | Chen ................... G06K 9/0063 345/426 |
| 2015/0356341 | A1* | 12/2015 | Eccles ................. G06K 9/0063 382/224 |

OTHER PUBLICATIONS

"A Stereo Vision-Based Obstacle Detection System in Vehicles", Kunsoo Huh, Jaehak Park, Junyeon Hwang and Daegun Hong, Optics and Lasers in Engineering, vol. 46, Issue 2, Feb. 2008 (2 pages).

"Multi-Sensor Detection and Tracking of Humans for Safe Operations with Unmanned Ground Vehicles", Susan M. Mike Hoffelder and Daniel D. Morris, 2008 (6 pages).

"Looking-In and Looking-Out of a Vehicle: Computer-Vision-Based Enhanced Vehicle Safety", Mohan Manubhai Trivedi, Tarak Gandhi and Joel McCall, IEEE Transactions on Intelligent Transportation Systems, vol. 8, No. 1, Mar. 2007 (15 pages).

\* cited by examiner

STEREO VISION FOR SENSING VEHICLES OPERATING ENVIRONMENT

This is a non-provisional application based upon U.S. provisional patent application Ser. No. 61/981,408 entitled "STEREO VISION FOR SENSING VEHICLES OPERATING ENVIRONMENT", filed Apr. 18, 2014, which is incorporated herein by reference.

BACKGROUND OF THE INVENTION

1. Field of the Invention

The present invention relates to vision systems for vehicles, and, more particularly, to stereo vision systems for vehicles and image processing of stereo images.

2. Description of the Related Art

Unmanned vehicle 3D perception systems have numerous military and commercial applications for performing in cluttered environments and detecting obstacles while mapping terrain. Several technical hurdles remain for this technology to be practical for widespread use. Current terrain detection solutions typically rely on active geometry sensing from LIDAR or RADAR sensors, all of which are easily detectable by enemy forces. Current stereo algorithms work using high signal to noise imagery and mainly use visible light cameras. LIDAR is a remote sensing technology that measures distance by illuminating a target with a laser and analyzing the reflected light. Although broadly LIDAR is used by many as an acronym of Light Detection And Ranging, the term LIDAR is also a commonly used military reference to "Laser Illuminated Detection And Ranging."

Current LIDAR range sensors provide a very high detailed, geometric view of the world and can be used to create 3D models of objects, but the use of LIDAR has severe limitations in certain applications, particularly in agriculture. The environment is often standing crop, which appears to LIDAR as obstacles, and the limitations at seeing through obscurants such as dust, snow, rain, smoke, etc.

What is needed in the art is a vision system for a vehicle that efficiently extends the operating environment of the vehicle.

SUMMARY OF THE INVENTION

The present invention provides an autonomous vehicle having a stereo vision system.

The invention in one form is directed to a vehicle including a chassis, a drive system carrying the chassis, and a vision system carried by the chassis. The vision system having a stereo visible light camera producing a colorized 3D point cloud and a stereo long wave infrared camera producing 3D data. The vision system being configured to fuse the 3D data with the 3D point cloud thereby producing an enhanced 3D point cloud.

The invention in another form is directed to a vision system, for use with a vehicle, having a stereo visible light camera producing a colorized 3D point cloud and a stereo long wave infrared camera producing 3D data. The vision system being configured to fuse the 3D data with the 3D point cloud thereby producing an enhanced 3D point cloud.

The invention in yet another form is directed to a method of directing a vehicle using a vision system. The method includes the steps of: producing a colorized 3D point cloud with data from a stereo visible light camera; and fusing 3D data from a stereo long wave infrared camera with the 3D point cloud to thereby produce an enhanced 3D point cloud that is used to direct tasks of the vehicle.

An advantage of the present invention is that objects that may be hidden by dust are resolved and detected so that the vehicle can react to the presence of the object.

Another advantage is that the vehicle has a companion aerial vision system to gather data.

Yet another advantage of the present invention is that the autonomous nature of the vehicle is leveraged to allow operation in otherwise marginal or hostile environments.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 13:
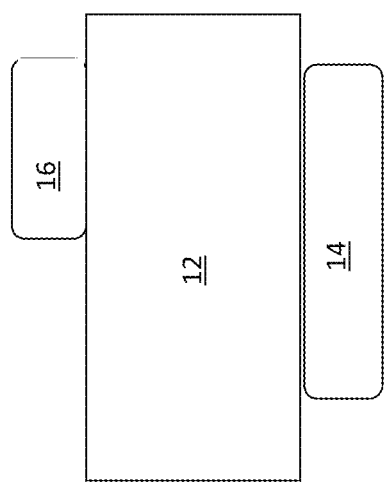
FIG. 13 is a schematized view of a vehicle having a vision system of the present invention associated therewith.

Referring now to the drawings, there is illustrated (in FIG. 13 in schematized form) a vehicle 10 having a chassis 12, a drive system 14 and a vision system 16. Vision system 16 provides information to systems of vehicle 10, such as a controller that controls drive system 14 so that vehicle 10 can be operated in an autonomous fashion.

Figure 14:
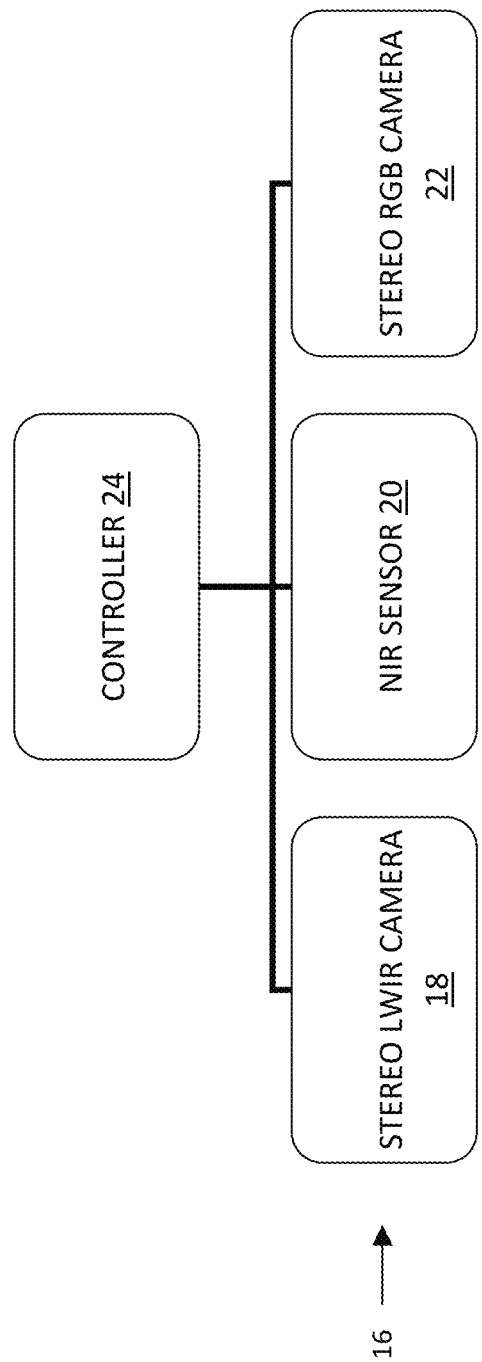
FIG. 14 is a block diagram of the vision system of the present invention.

As represented in FIG. 14, vision system 16 includes an IR stereo system, such as a stereo LWIR camera 18 and/or NIR sensor 20, which provide valuable information for classifying objects as vegetation, and for seeing through vegetation for more substantial and important targets, such as animals, people, machines, etc. Vision system 16 additionally includes a stereo RGB camera 22. A controller 24 can receive data from stereo LWIR camera 18, NIR sensor 20 and stereo RGB camera 22 to undertake the processing of image data received therefrom using algorithms of the present invention. With this increased sensing capability, many farming operations become accessible, and safe for vehicle automation. The present invention, among other things, provides a feature and object detection system that maintains functionality in low light scenarios and can detect obstacles within vegetation. Allowing for improved detection of obstacles for agriculture/mining applications, which allow for more effective safety and autonomy of systems.

Figure 1:
FIG. 1 illustrates an image taken with a Short Wavelength Infrared (SWIR) camera and a visible light camera image of the same scene, to illustrate a need for the fusion of data provided by the present invention.

Near Infrared (NIR) and Short Wavelength Infrared (SWIR) cameras operate on the edge of the visible light spectrum from the wavelength of 0.75 to 3 µm. The infrared radiation in this spectrum interacts with objects in a similar manner as the visible wavelengths. This makes the images from the NIR and SWIR similar to the visible light images in resolution and detail. The main difference is that the infrared images are not in color. Energy from within these wavelengths must usually be reflected in order to obtain good imagery. This means that there must be some external illumination and at night, these cameras typically require some type of artificial illumination. FIG. 1 illustrates a SWIR image from sensor 20 and a picture of the same scene from camera 22, which is the visible light image to show the ability to detect objects with a combination of images.

Figure 2:
FIG. 2 is a Long Wave Infrared (LWIR) image with thermally radiant objects being clearly visible.

Long Wavelength Infrared cameras 18 operate on the far end of the infrared spectrum from the wavelength of 8 to 15 µm. The Long Wavelength Infrared (LWIR) cameras band is called the thermal band. Cameras in this range can be completely passive. This means that they require no external illumination. In FIG. 2 there is shown a LWIR image with thermally radiant objects being clearly visible. The infrared cameras react to thermal energy, so this makes them optimal for use at night and conditions like dust, fog, or smoke. The LWIR camera 18 is highly tolerable to such conditions.

Although there has been significant work in the area of visible light stereo depth perception, there has been little research into infrared spectrum stereo vision. This may be partially due to inaccessibility of sensors in previous years due to cost, as well as experimentation on older sensors that failed to perform using dense stereo computation due to high noise levels. With the cost reductions of IR sensors in recent years there have been further attempts at computing range from infrared pairs; most common methods have been for pedestrian detection and have used a priori models of objects (humans) and blob detection to perform depth computation. The present invention uses sparse algorithms to determine a set of feature correspondences based on edge features and a segmentation/interpolation algorithm is used to fill in depth regions between sparse points. This algorithm is more adaptable per specific camera and allows cameras with noisier images to still be functional, where dense algorithms will fail. The algorithm is very suitable to overhead imagery where edge data is prominent and especially in urban environments where terrain is structured and surfaces between edges tend be to linear.

TABLE 1

System capabilities

| Features | Summary |
| --- | --- |
| Terrain Sensing and Mapping based on passive stereo imagery with low signal to noise ratio | Rely on edge based features, interpolate segmented regions |
| Can use typical aerial data from urban and rural settings | Data collection done locally using ground system and/or quad rotor assigned thereto. |
| Use of many existing sensors for range, field of view, resolution, frame rate and power | Sensor data fusion |
| Used on various scales of Unmanned Vehicles, with a target of low cost and 60 degree field of view | Sensor performance of various levels which can be integrated with the vision system |
| Uses low light sensors and machine vision stereo algorithms | Use vision algorithms with embedded stereo processor |
| Produces accurate real time terrain data | Use a vehicle vision system with algorithms that operate at 1 Hz refresh rate |
| Robust software system | Algorithms have a high noise tolerance and scalability, modular to camera selection and stereo baseline |

Figure 3:
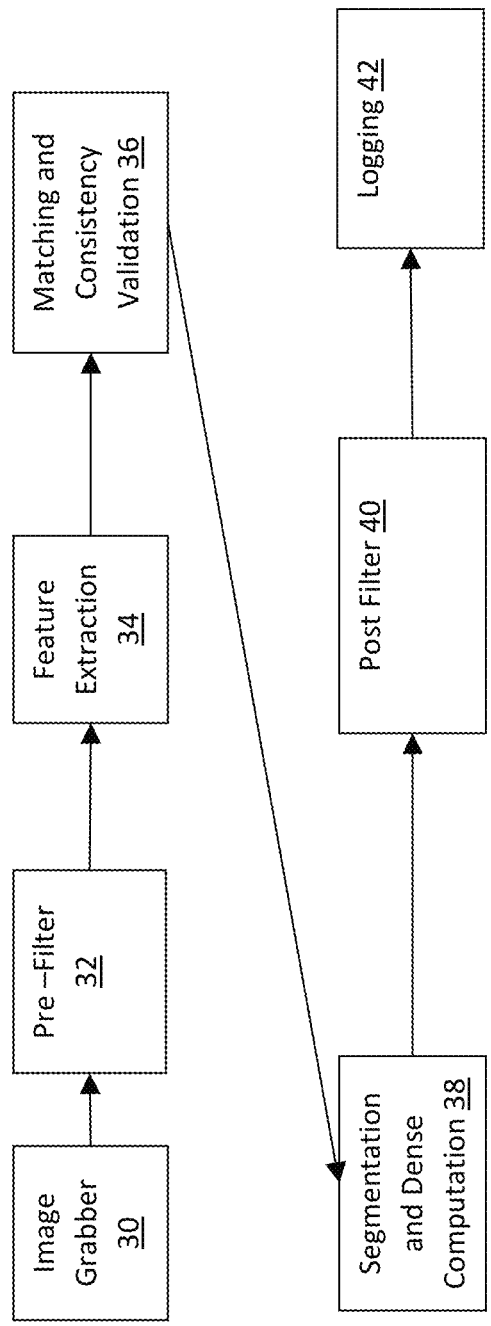
FIG. 3 illustrates an infrared stereo algorithm data pipeline of the present invention.

FIG. 3 illustrates an infrared stereo algorithm data pipeline having steps that include an image grabbing function 30, a pre-filter 32, a feature extraction 34, a matching and consistency validation 36, segmentation and dense computation 38, a post filter 40 and logging 42 capability.

The vision system of the present invention can be used with existing robots (ground or aerial) to model terrain and detect features/objects.

Sensors were studied to determine relevant sensors that could be used in a stereo camera system, with an emphasis on tradeoffs for quality, cost, weight etc.

Sensors are selected for the vision system using existing hardware and baseline sensors.

The sensors allow data collection: to collect IR imagery of terrain data

Feature extraction and evaluation, determine which features can be used for sufficient pixel correspondence in infrared image pairs The present invention uses a stereo algorithm using infrared imagery to resolved depth data of terrain, with the algorithm being tuned to perform with the best results at real time These features are explained in more detail in the following sections. The features and summary of requirements is contained in Table 1.

A survey was performed of commercially available IR camera modules and the selection of prime candidates for use in the three desired scale classes was done. It was important to identify sensors which allow for stereo vision processing; that is the cameras allow for hardware synchronization between cameras, have a global shutter to handle motion, allow for digital interfacing, have rugged properties for military and off-road vehicle usage, allow for short exposure time to minimize motion blur and allow for proper calibration between cameras (cameras must have very similar properties), and not require extensive external components for cooling or illumination. Further, signal to noise characteristics were used to help quantize camera quality for comparison.

The stereo algorithm functions in the desired environment, using sensors selected and hardware bread-boarded because of the ease of accessibility for collecting data. The present invention uses an embedded processor platform suitable for real time stereo algorithms that are used to interface to the IR camera and collect terrain images.

Representative data sets that match the requirements for targets and expected environments were collected. Data sets were gathered around testing grounds (buildings, varying brush types, varying tree leaf densities, coniferous and deciduous trees). Each data set was captured from a moving vehicle such that detection range could be investigated.

Figure 4:
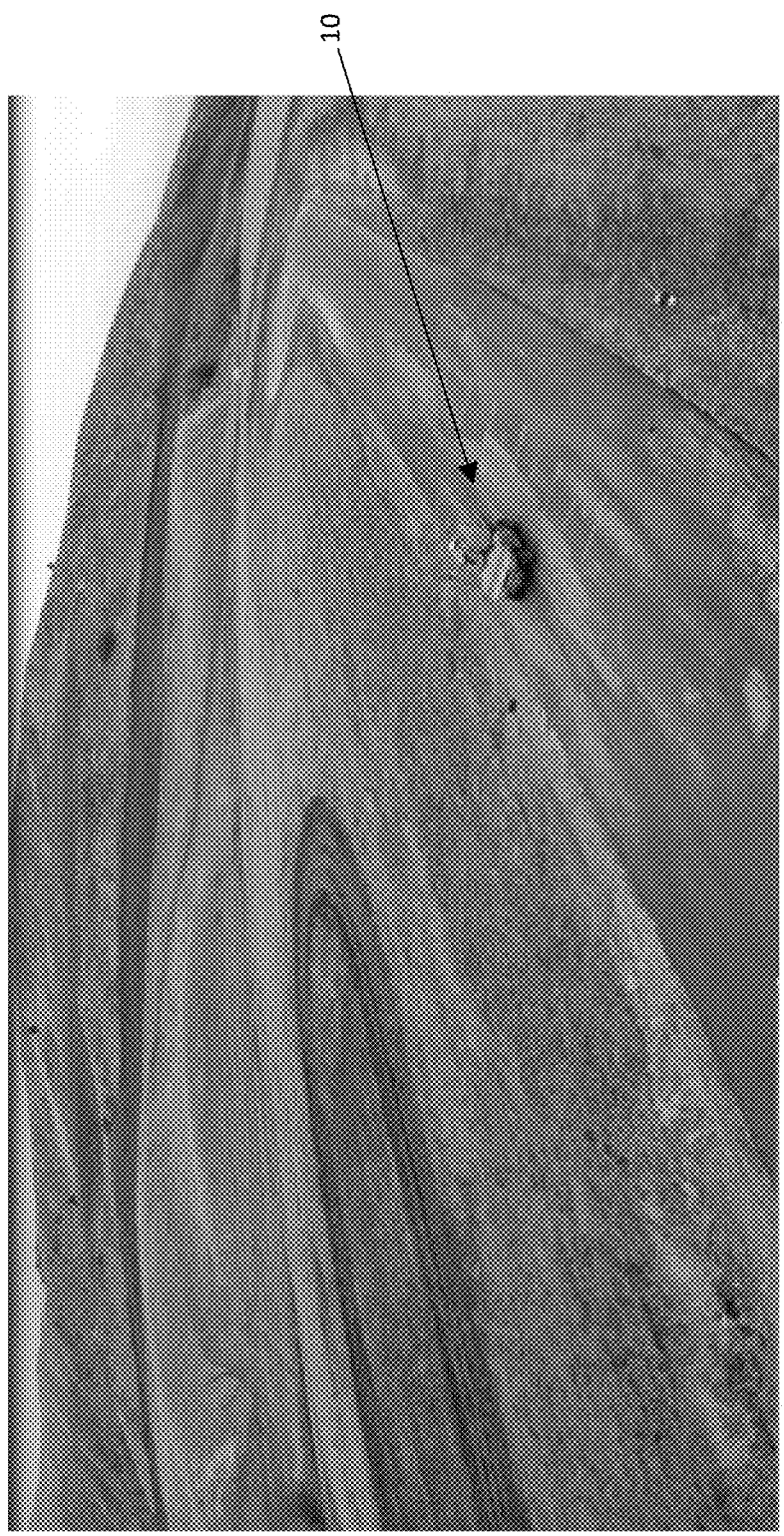
FIG. 4 is an aerial image captured on the DJI 550 platform.
Figure 5:
FIG. 5 is another aerial image captured on the DJI 550 platform.

For the aerial photography, a quad-rotor platform was used (see FIGS. 4 and 5 of aerial images capture on the DJI 550 platform). This facilitates the stereo imagery capture of the lighter stereo system. RTK-corrected GPS data is captured on each target of interest. Having the geo-tagged target data, the present invention measures the accuracy of the stereo point clouds and the processing algorithms.

In addition to aerial analysis, the technology of unmanned ground vehicles (UGVs) is leveraged. Several automated tractors are used as platforms for rural data acquisition, and an automated Ford F-150 was used for urban collection. While some of the urban settings may not easily lend themselves to automated testing (for safety concerns), all of the rural testing is automated. This eliminates variability in the test data from human path-following inconsistencies. By collecting multiple data sets, there is increased statistical significance of the findings, and the automation decreases the variability between each data set. Automating the testing also helps increase safety, especially for testing in low-light/night conditions.

Figure 6:
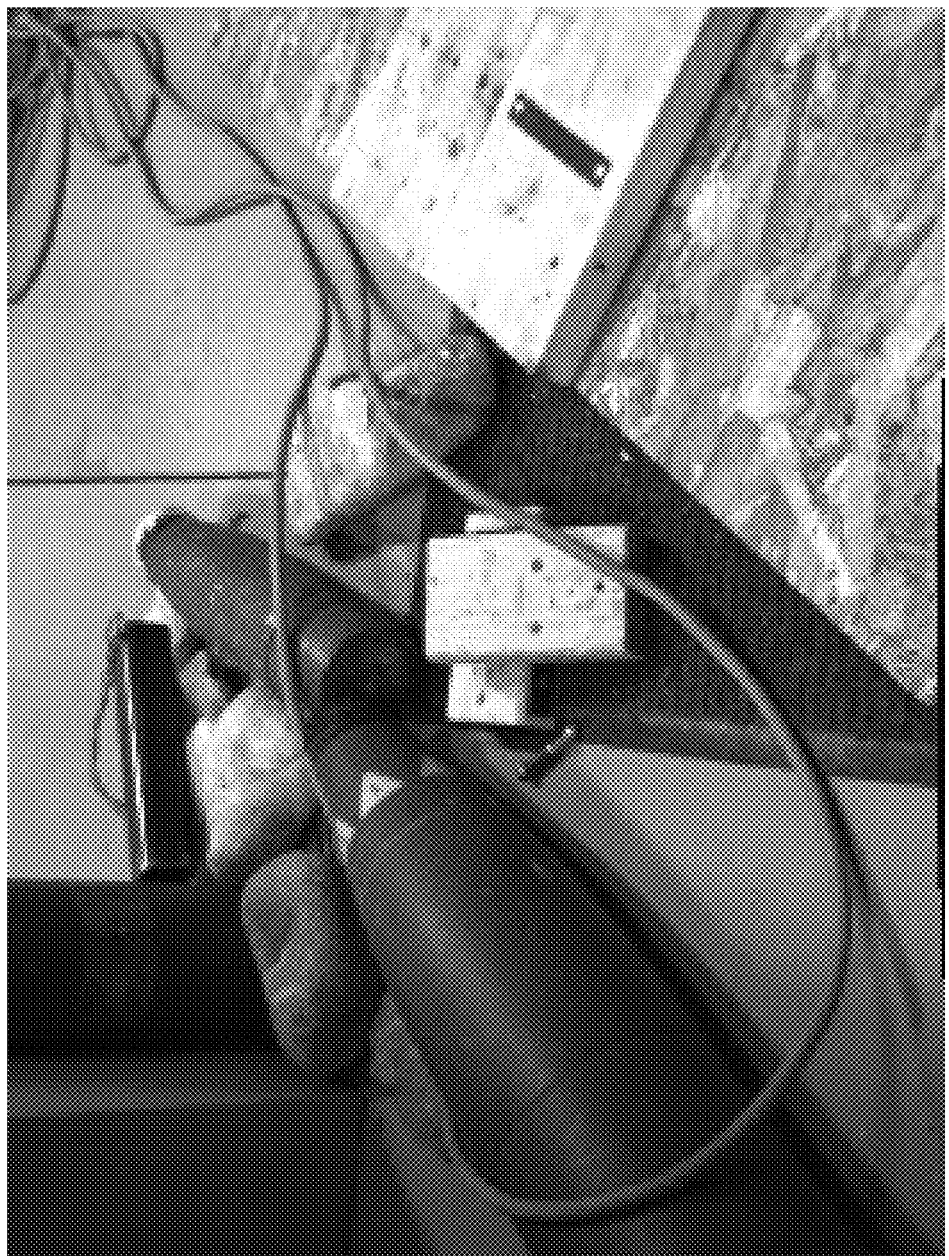
FIG. 6 is an image of items laying about a table.
Figure 7:
FIG. 7 is the image of FIG. 6 that is processed by the present invention to show edge features highlighted.

Correspondence feature extraction and matching algorithm: The main software development of the present invention assessed which vision feature type is most effective for pixel correspondence of noisy IR images. Log-Gabor edge type features are sufficient for good correspondence, but newer features such as a Ferns algorithm, Binary Robust Independent Elementary Features (BRIEF), and Speeded Up Robust Features (SURF) improve accuracy/speed/coverage tradeoffs of processed terrain images collected. The present invention has a stereo algorithm framework (see FIG. 6 of an image—that is processed in FIG. 7 to show edge features highlighted) that allows for methodologies to be rapidly integrated and uses interfaces to OpenCV (Open Source Computer Vision) such that desired feature types are available for analysis.

Figure 8:
FIG. 8 is a stereo infrared image of a road scene.
Figure 9:
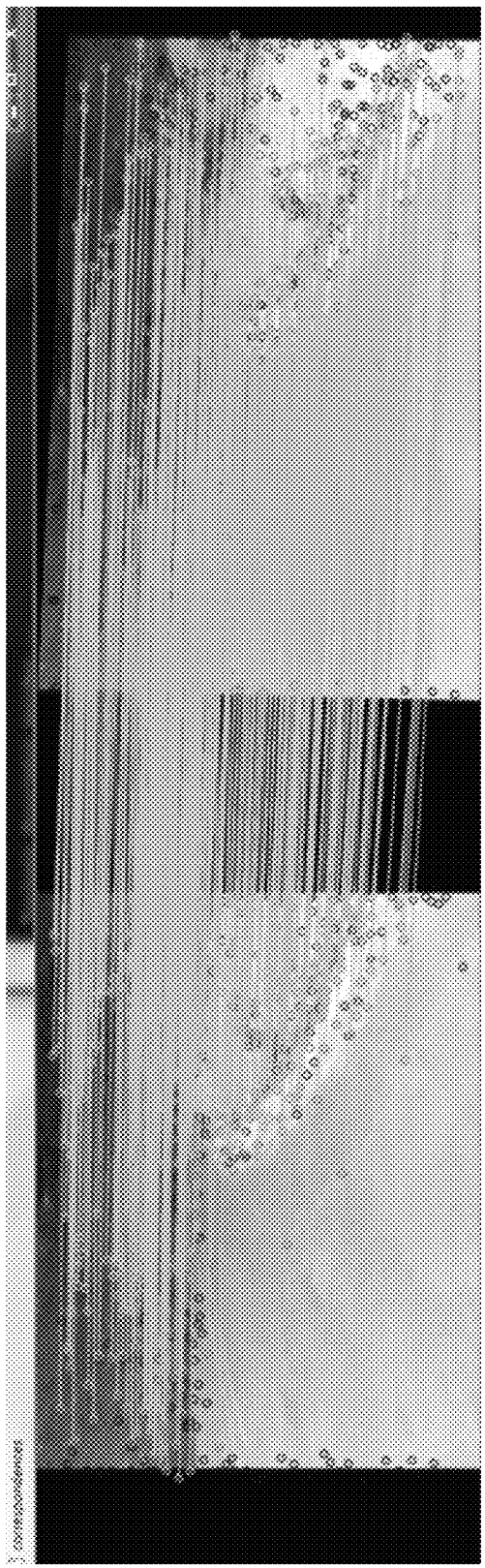
FIG. 9 is the same scene as FIG. 8 with the sparse features being identified and used by the present invention to populate the 3D data cloud.

Sparse features can be used to detect obstacles in Infrared imagery using thermal cameras (see FIGS. 8 and 9). Sparse feature correspondence algorithms of the present invention use known camera constraints to remove outlier matches and ensure consistency between images. The algorithms find correspondence in left/right infrared images. The horizontal lines in FIG. 9, indicate matches between images, in this example Speeded Up Robust features are used, and consistency is checked between frames. Applying the known camera intrinsic and the camera baselines, the 3D location of each of the circles at the end of the lines can be determined.

Figure 10:
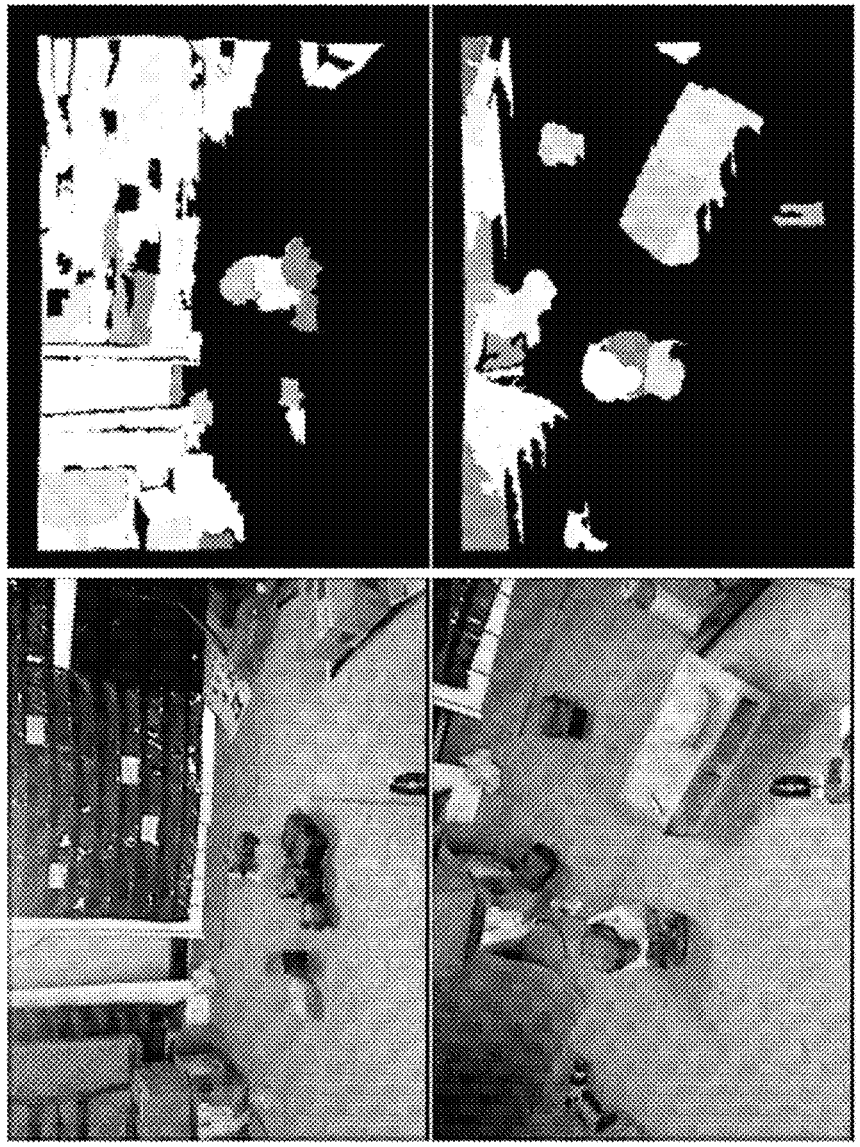
FIG. 10 illustrates the use of segmenting point clouds using 3d and texture, with the left image being a view of the scene, with the right image showing a segmented scene projected onto an image plane with the object shaded in different intensities.
Figure 11:
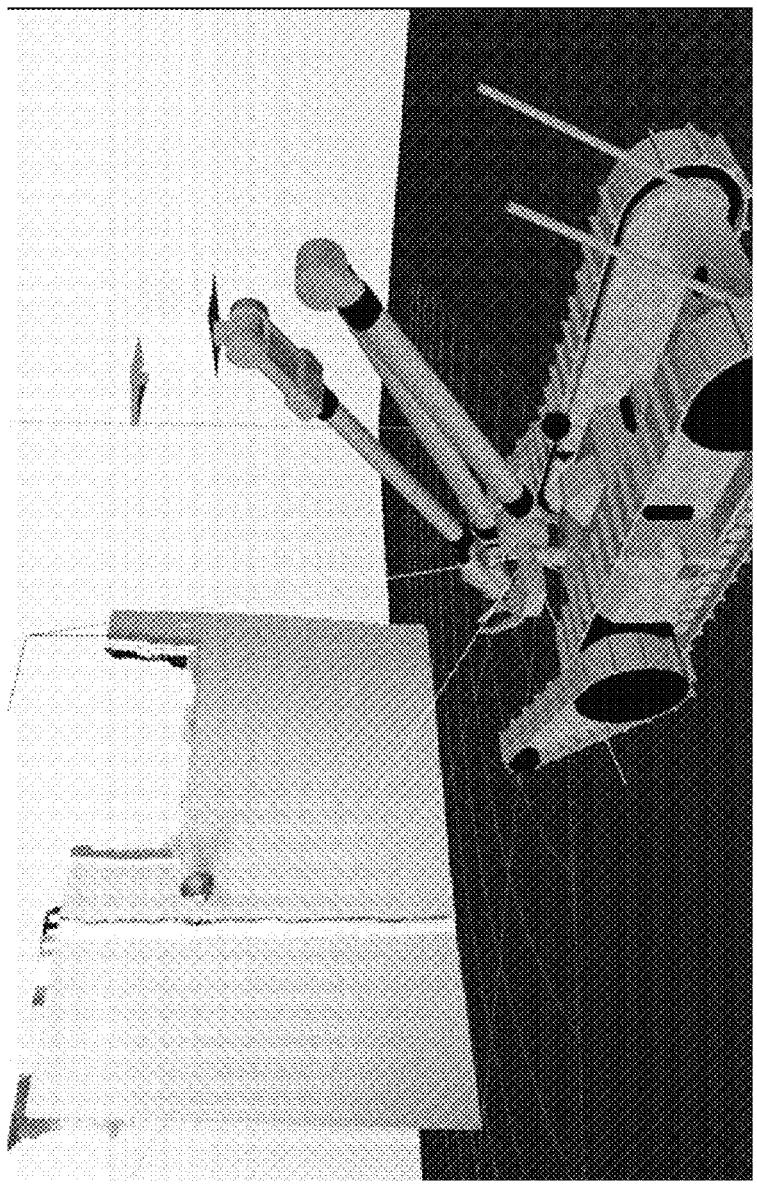
FIG. 11 illustrates a plane interpolation algorithm of the present invention being used to resolve depth of wall planes that lack texture.
Figure 12:
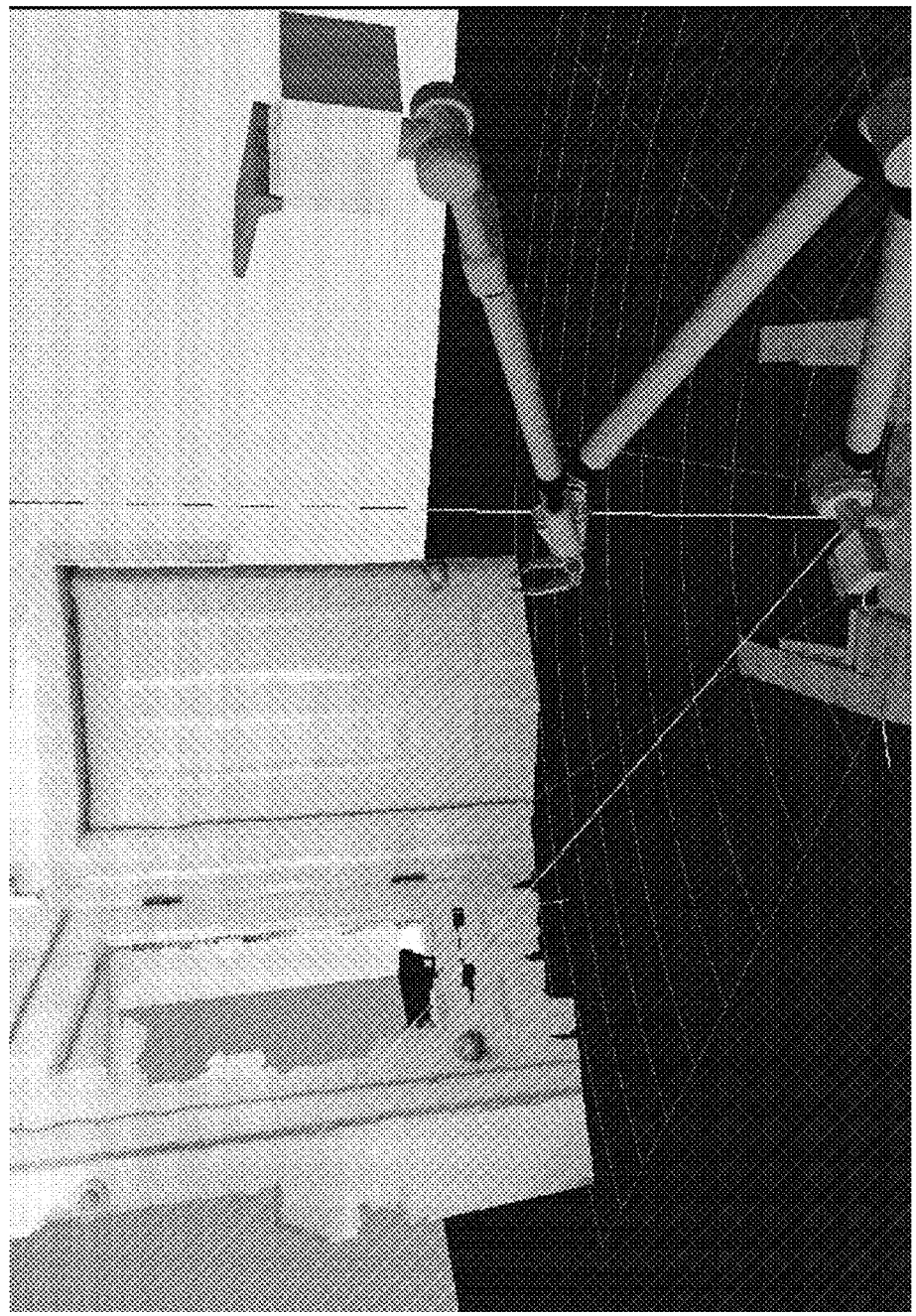
FIG. 12 also illustrates a plane interpolation algorithm being used to resolve depth of wall planes that lack texture.

Sparse to Depth Computation, segmentation and hole filling: Because a sparse stereo algorithm won't completely generate an estimate of depth for every pixel, a secondary hole-filling algorithm is used. For this task, a segmentation algorithm is used to partition overhead terrain and a reconstruction algorithm performs in real time on an embedded processor. A Mean shift segmentation algorithm and a linear plane fit interpolation algorithm are used to fill empty regions (FIG. 10). In FIG. 10 segmenting point clouds using 3d and texture are illustrated with the left image being a view of the scene, with the right image showing a segmented scene projected onto an image plane with the object shaded in different intensities. In FIGS. 11 and 12 a plane interpolation algorithm is used to resolve depth of wall planes that lack texture.

The sensing and perception systems on vehicle 10 are to collect data such that the vehicle can interact with its environment. One of the data types/formats that appears to be most useful is colorized 3D point clouds. This is typically achieved by overlaying a camera image on top of range data. The combination of image analysis (edge/blob detection) with detecting features in the 3D range data allows for better reliability in the detection and identification of features.

RGB cameras and laser sensors have significant problems seeing through obscurants such as dust or smoke. In agriculture dust is a common problem. Sensing and detecting clouds of dust can be of interest, but we are typically more interested in the features hidden behind a dust cloud. The present invention provides sensing systems that can penetrate dust clouds and provide information on the objects/features hidden behind dust clouds. While Radar is very good at penetrating dust, it typically only detects macro features (large scale features) so it is normally very difficult to get higher resolution information that provides useful information on smaller features. Typically the wavelength of the energy is proportional to how well it can penetrate obscurants. There is a relationship between obscurant particle sizes and how well a certain wavelength can penetrate, so higher wavelengths (e.g. LWIR) are typically better at penetrating obscurants. By using a stereo LWIR camera data is used to fill in the 3D data where dust obscures certain fields of vision of other sensing devices (RGB cameras, laser scanners, etc.).

There is also a known ratio between energy levels in the NIR/SWIR and red spectrum ranges for detection of chlorophyll. The present invention can use this to detect foliage, which is abundantly present in many agricultural environments. The present invention measures and compares near infrared and red spectrum energy level ratios. This can be used to help differentiate plants from other objects (rock vs shrub). For this reason it is useful to have an NIR sensor included in the sensing system of the present invention.

In summary the present invention would have and provide:
A Stereo RGB camera (provide colorized 3D point cloud)
A Stereo LWIR camera (fill in 3D data where obscurants/dust is present, and detection of warm blooded creatures)
An NIR sensor (for foliage/plant detection)

The algorithms fuse data from these 3 sensors to provide an Enhanced 3D point cloud that will allow the software to make decisions with higher levels of confidence.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle, comprising:
    a chassis;
    a drive system carrying the chassis; and
    a vision system carried by said chassis, said vision system including:
        a stereo visible light camera producing a colorized 3D data point cloud;
        a stereo long wave infrared (LWIR) camera producing 3D LWIR data; and
        a near infrared (NIR) camera, wherein both said LWIR camera and said NIR camera produce data that is fused with said 3D point cloud,
        wherein said fusing includes detecting foliage by way of measuring and comparing NIR and red spectrum energy level ratios,
        wherein the LWIR camera data is used to fill in information in areas of said 3D point cloud including areas where there is low light at night or dust which obscures a field of vision of said stereo visible light camera, and wherein sparse computations are used to determine sparse points based on edge features, and wherein a segmentation computation and a hole-filling computation are used to fill in regions, including depth regions, between sparse points to fuse with the 3D point cloud;
        wherein said vision system is configured to fuse said 3D data, detected data, and filled-in data with said 3D point cloud to produce an enhanced 3D point cloud.

2. The vehicle of claim 1, wherein said drive system is directed to at least one of steer, change velocity, start and stop the vehicle, dependent upon said enhanced 3D point cloud.

3. The vehicle of claim 1, wherein said vision system is further configured to extract features from the 3D point cloud and the 3D data as part of producing said enhanced 3D point cloud.

4. The vehicle of claim 3, wherein said vision system is further configured to match at least some of the extracted features from the 3D point cloud and the 3D data as part of producing said enhanced 3D point cloud.

5. The vehicle of claim 4, wherein said vision system is further configured to perform a consistency validation of the 3D data that is matched.

6. A vision system for use by a vehicle having a drive system, the vision system comprising:
    a stereo visible light camera producing a colorized 3D point cloud;
    a stereo long wave infrared (LWIR) camera producing 3D LWIR data; and
    a near infrared (NIR) camera, wherein both said stereo LWIR camera and said NIR camera produce data that is fused with said 3D point cloud;
    wherein said fusing includes detecting foliage by way of measuring and comparing NIR and red spectrum energy level ratios,
    wherein LWIR data is used to fill in information in areas of said 3D point including areas where there is low light at night or dust which obscures a field of vision of said stereo visible light camera, and wherein sparse computations are used to determine sparse points based on edge features, and wherein a segmentation computation and a hole-filling computation are used to fill in regions, including depth regions, between sparse points to fuse with the 3D point cloud,
    wherein said vision system is configured to fuse said 3D LWIR data, detected data, and filled-in data with said 3D point cloud to produce an enhanced 3D point cloud.

7. The vision system of claim 6, wherein the drive system is directed to at least one of steer, change velocity, start and stop the vehicle, dependent upon said enhanced 3D point cloud.

8. The vision system of claim 6, wherein said vision system is further configured to extract features from the 3D point cloud and the 3D data as part of producing said enhanced 3D point cloud.

9. The vision system of claim 8, wherein said vision system is further configured to match at least some of the extracted features from the 3D point cloud and the 3D data as part of producing said enhanced 3D point cloud.

10. The vision system of claim 9, wherein said vision system is further configured to perform a consistency validation of the 3D data that is matched.

11. A method of directing a vehicle using a vision system, the method comprising the steps of:
    producing a colorized 3D point cloud with data from a stereo visible light camera;
    fusing data from a stereo long wave infrared (LWIR) camera with said 3D point cloud;
    fusing data from a near infrared (NIR) camera with said 3D point cloud;
    detecting foliage via fusing by way of measuring and comparing NIR and red spectrum energy level ratios,
    filling in information via the LWIR camera data in areas of said 3D point cloud including areas where there is low light at night or dust which obscures a field of vision of said stereo visible light camera;
    filling in regions, including depth regions via a segmentation computation and a hole-filling computation between sparse points to fuse with the 3D point cloud; and
    producing from the fused, detected, and filled-in 3D data an enhanced 3D point cloud that is used to direct tasks of the vehicle.

12. The method of claim 11, further comprising the step of directing a drive system of the vehicle to at least one of steer, change velocity, start and stop the vehicle, dependent upon said enhanced 3D point cloud.

13. The method of claim 11, wherein said vision system is further configured to extract features from the 3D point cloud and the 3D data as part of producing said enhanced 3D point cloud.

14. The method of claim 13, wherein said vision system is further configured to match at least some of the extracted features from the 3D point cloud and the 3D data as part of producing said enhanced 3D point cloud.

15. The method of claim 14, wherein said vision system is further configured to perform a consistency validation of the 3D data that is matched.

\* \* \* \* \*